(12) United States Patent
Bilinski et al.

(10) Patent No.: US 9,753,924 B2
(45) Date of Patent: Sep. 5, 2017

(54) SELECTION OF CLIPS FOR SHARING STREAMING CONTENT

(71) Applicant: Google Inc., Mountain View, CA (US)

(72) Inventors: Brandon Bilinski, San Francisco, CA (US); Jai John Mani, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 574 days.

(21) Appl. No.: 13/647,747

(22) Filed: Oct. 9, 2012

(65) Prior Publication Data

US 2014/0101570 A1    Apr. 10, 2014

(51) Int. Cl.
*G06F 3/01*    (2006.01)
*G06F 17/30*    (2006.01)

(52) U.S. Cl.
CPC .............................. *G06F 17/30038* (2013.01)

(58) Field of Classification Search
CPC ..................... G06F 17/30038; G06F 17/30817
USPC .......................................................... 715/753
See application file for complete search history.

(56) References Cited

U.S. PATENT DOCUMENTS

| | | | |
|---|---|---|---|
| 8,196,168 B1* | 6/2012 | Bryan et al. | 725/46 |
| 2003/0093790 A1* | 5/2003 | Logan et al. | 725/38 |
| 2007/0168543 A1* | 7/2007 | Krikorian et al. | 709/231 |
| 2008/0313541 A1* | 12/2008 | Shafton et al. | 715/725 |
| 2009/0049118 A1* | 2/2009 | Stevens | 709/203 |
| 2010/0036854 A1* | 2/2010 | Regan et al. | 707/10 |
| 2010/0188575 A1* | 7/2010 | Salomons et al. | 348/553 |
| 2011/0072078 A1* | 3/2011 | Chai et al. | 709/203 |
| 2011/0225608 A1* | 9/2011 | Lopatecki et al. | 725/34 |
| 2011/0231887 A1 | 9/2011 | West et al. | |
| 2012/0148215 A1 | 6/2012 | Kennedy et al. | |
| 2013/0326406 A1* | 12/2013 | Reiley et al. | 715/810 |
| 2014/0196066 A1* | 7/2014 | Wu | G06F 17/30017 725/14 |

FOREIGN PATENT DOCUMENTS

CN    WO 2012079188 A1 *    6/2012    ....... G06F 17/30017

OTHER PUBLICATIONS

Extended European Search Report for EP 13185131.3 dated Jan. 3, 2014.

* cited by examiner

*Primary Examiner* — Jennifer To
*Assistant Examiner* — John Repsher, III
(74) *Attorney, Agent, or Firm* — Morris & Kamlay LLP

(57) ABSTRACT

A method for sharing digital media may include receiving an indication from a first user for sharing a clip selection from a digital media item (DMI) with a second user. A start point and an end point of the clip selection may be determined. The determination may be based on a number of times the first user has previously consumed the digital media item. An indication of the clip selection may be communicated to the second user. The indication for the sharing may be received in response to a sharing query. The query may be displayed to the first user during a consumption of the DMI by the first user. If the first user has not previously consumed the DMI, then during the consumption, the end point may be set as a current location in the digital media item at a time when the indication for the sharing was received.

18 Claims, 8 Drawing Sheets

SELECTION OF CLIPS FOR SHARING STREAMING CONTENT

TECHNICAL FIELD

Aspects of the present disclosure relate generally to the field of processing digital media content. More specifically, certain implementations of the present disclosure relate to system and/or method for selection of clips for sharing streaming content.

BACKGROUND

As social networks gain in popularity, there is an increased interest in sharing of various digital media within such social networks. However, sharing of digital media may be complicated because of digital rights management issues related to the specific digital media. Additionally, determining which segment (or clip) of the digital media to share may be a time-consuming and cumbersome task.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for intelligent selection of clips for sharing streaming content, substantially as shown in and/or described in connection with at least one of the figures, as set forth more completely in the claims.

In accordance with an example embodiment of the disclosure, a method for sharing digital media may include receiving an indication from a first user for sharing a clip selection from a digital media item with a second user. A start point and an end point of the clip selection may be determined. The determination may be based on a number of times the first user has previously consumed the digital media item. An indication of the clip selection may be communicated to the second user. The indication for the sharing may be received in response to a sharing query. The sharing query may be displayed to the first user during a consumption of the digital media item by the first user. The first user and the second user may each be an individual user or multiple individuals (e.g., users sharing to a circle, public post, etc.).

If the first user has not previously consumed the digital media item, then during the consumption, the end point may be set as a current location in the digital media item at a time when the indication for the sharing was received. The start point may be set at a location in the digital media item that is earlier than the current location by a predetermined time interval. If the first user has previously consumed the digital media item, then during the consumption, the start point may be set as a current location in the digital media item at a time when the indication for the sharing was received. The end point may be set at a location in the digital media item that is later than the current location by a predetermined time interval.

The start point and the end point may be displayed on a duration bar of the digital media item. One or both of the start point and/or the end point of the clip selection may be adjusted based on a command from the first user. The adjusting may be limited so that duration of the clip selection does not exceed maximum allowed clip duration. The indication for the sharing may be received before or after the consumption of the digital media item by the first user.

If the indication for the sharing is received before or after the consumption of the digital media item by the first use, the start point and the end point of the clip selection may be set to coincide with a start point and an end point of another clip selection of the digital media item. The another clip selection may be a most shared selection by a plurality of other users that have previously consumed the digital media item.

In accordance with another example embodiment of the disclosure, a system for sharing digital media may include one or more circuits comprising in a user device, the one or more circuits may be operable to receive an indication from a first user for sharing a clip selection from a digital media item with a second user. A start point and an end point of the clip selection may be determined. The determining may be based on a number of times the first user has previously consumed the digital media item. An indication of the clip selection may be communicated to the second user.

In accordance with yet another example embodiment of the disclosure, a system for sharing digital media may include one or more circuits comprising in a user device, the one or more circuits being operable to receive an indication from a first user for sharing at least one clip selection of a digital media item with a second user. A start point and an end point of a first clip selection of the digital media item may be determined. The determining may be based on a number times the first user has previously consumed the digital media item. A start point and an end point of a second clip selection may be determined to coincide with a start point and an end point of another clip selection of the digital media item. The another clip selection may be a most shared selection by a plurality of other users that have previously consumed the digital media item. The first user may select between the first clip selection and the second clip selection for sharing with the second user. A tuple may be communicated to the second user for the sharing, the tuple comprising identification information of the digital media item, start point information and end point information based on the selecting.

These and other advantages, aspects and features of the present disclosure, as well as details of illustrated implementation(s) thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "e.g.," introduces a list of one or more non-limiting examples, instances, or illustrations.

As used herein the term "digital media" or "digital media item" may include any discrete media object, such as streaming media, audio files, video files, games, slide shows, camera captures, and the like. Such digital media may be played back, displayed, or otherwise rendered for a user to consume the digital media.

The present disclosure relates to a method and system for intelligent selection of clips for sharing streaming content. In various implementations, a user device may provide a graphical user interface (GUI), which may be used for selection of a digital media item clip for sharing. More specifically, the GUI may be used to detect a user command for sharing of a clip from the digital media item. Once a share command is detected, the user device may communicate with a media backend to determine whether the digital media item has been previously consumed. A start and end point of the clip selection may then be determined automatically, based on the determination of whether the digital media item has been previously consumed. After the start and end points of the clip selection have been determined, the user may be given an option to adjust the start/end points prior to sending the clip selection to a second user.

For example, a method for sharing digital media may include receiving an indication from a first user for sharing a clip selection from a digital media item with a second user. A start point and an end point of the clip selection may be automatically determined. The determining may be based on a number of times the first user has previously consumed the digital media item. An indication of the clip selection may be communicated from the first (sharing) user to the second user. The first user and the second user may each be an individual user or multiple individuals (e.g., users sharing to a circle, public post, etc.).

Figure 1:
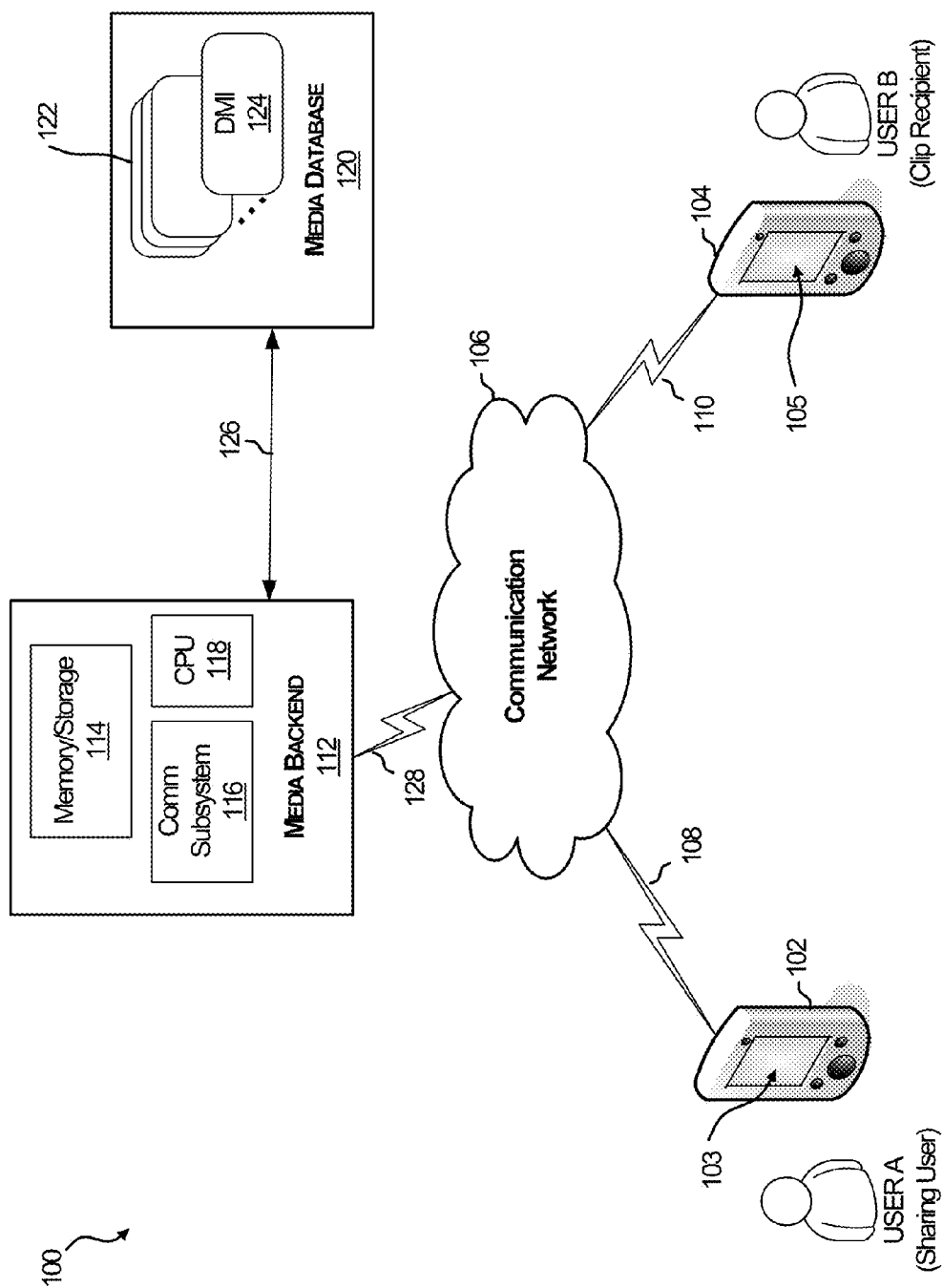
FIG. 1 is a block diagram illustrating example architecture for sharing of digital media content, in accordance with an example embodiment of the disclosure.

FIG. 1 is a block diagram illustrating example architecture for sharing of digital media content, in accordance with an example embodiment of the disclosure. Referring to FIG. 1, the example architecture 100 may comprise a first client device 102 of a sharing user (e.g., User A), a second client device 104 of a clip recipient (e.g., User B), a media backend 112, and a media database 120.

The client devices 102, 104 may comprise suitable circuitry, logic and/or code and may be operable to communicate with the media backend 112 and/or the media database 120 to receive one or more digital media items. Additionally, the client devices 102, 104 may be operable to render the received one or more digital media items for consumption by Users A and B, respectively. For example, if the digital media item comprises a video file or streaming video data, the client devices 102, 104 may render the digital media data for rendering on the device displays 103, 105, respectively. The client devices 102, 104 may comprise a handheld computing device (e.g., a cell phone, a smart phone, a personal data assistant (PDA), a tablet), a set-top box device, or another computing device.

Furthermore, the client devices 102, 104 may also include one or more transceivers for providing wired and/or wireless communication of data via the communication links 108, 110, respectively. In this regard, the communication links 108, 110 may comprise one or more wired and/or wireless communication links used to communicate data via the communication network 106.

The communication network 106 may comprise the Internet as well as any combination of a wired and/or wireless network, such as a wi-fi network, a WiMAX network (or another 802.1x enabled network), a satellite network, or a cellular telephone network.

The media backend 112 may comprise suitable circuitry, logic and/or code and may be operable to provide digital media related services to the client devices 102, 104. For example, the media backend 112 may provide digital media storage and management services, subscription services (e.g., streaming media subscription services), and digital media provisioning services (e.g., sale, transcoding and download of digital media). The media backend 112 may also comprise memory/storage 114, a communication subsystem 116 and a central processing unit (CPU) 118. Additionally, the media backend 112 may operate as, for example, a streaming content provider and may be operable to keep track of each digital media item that a user has viewed or listened to (e.g., a play or view count may be stored in the memory/storage block 114)

The communication subsystem 116 may comprise suitable circuitry, logic, and/or code and may be operable to provide communication of information to and from the media database 120 and/or the client devices 102, 104. For example, the communication subsystem 116 may include one or more transceivers for providing wired and/or wireless communication of data to and from the media database 120 (via the wired and/or wireless communication link 126), and/or the client devices 102, 104 via the communication network 106 and the communication links 108, 110.

The media database 120 may comprise suitable circuitry, logic and/or code and may be operable to manage a plurality of digital media items 122. Even though the media database 120 is illustrated as being separate from the media backend 112, the disclosure may not be limited in this regard. More specifically, the media database 120 may be implemented as part of the media backend 112.

In operation, user A may use the client device 102 to subscribe to a digital media provisioning service, such as digital media streaming service, managed by the media backend 112. As part of the digital media provisioning subscription, user A may have access to a plurality of digital media items 122 stored by the media database 120. For example, user A may have access to digital media item 124, which may be a streaming video or a song. Additionally, user A may have the option to purchase the digital media item 124 and download it (and store it) locally at the client device 102 or at a cloud-based digital media locker service. Additionally, as part of the digital media provisioning subscription, user A may be able to share a portion of the digital media item 124 with another user (e.g., user B). The duration of the shared portion may be limited (e.g., to 30 or 90 seconds) based on applicable digital rights for the specific digital media item 124.

In accordance with an example embodiment of the disclosure, the client device 102 may provide a graphical user interface (GUI), which may be used by the sharing user (user A) to initiate and complete sharing of a clip selection from the digital media item 124. For example, after user A initiates sharing, the user device 102 may communicate with the media backend 112 and may obtain information for the number of times user A has previously consumed the digital media item 124 (e.g., if the digital media item 124 is a song, then the media backend 112 may return a song play count). Based on the returned information on the previous consumption of the digital media item 124, the client device 102 may automatically display a suggested start and end point of the clip selection for sharing.

Figure 2A:
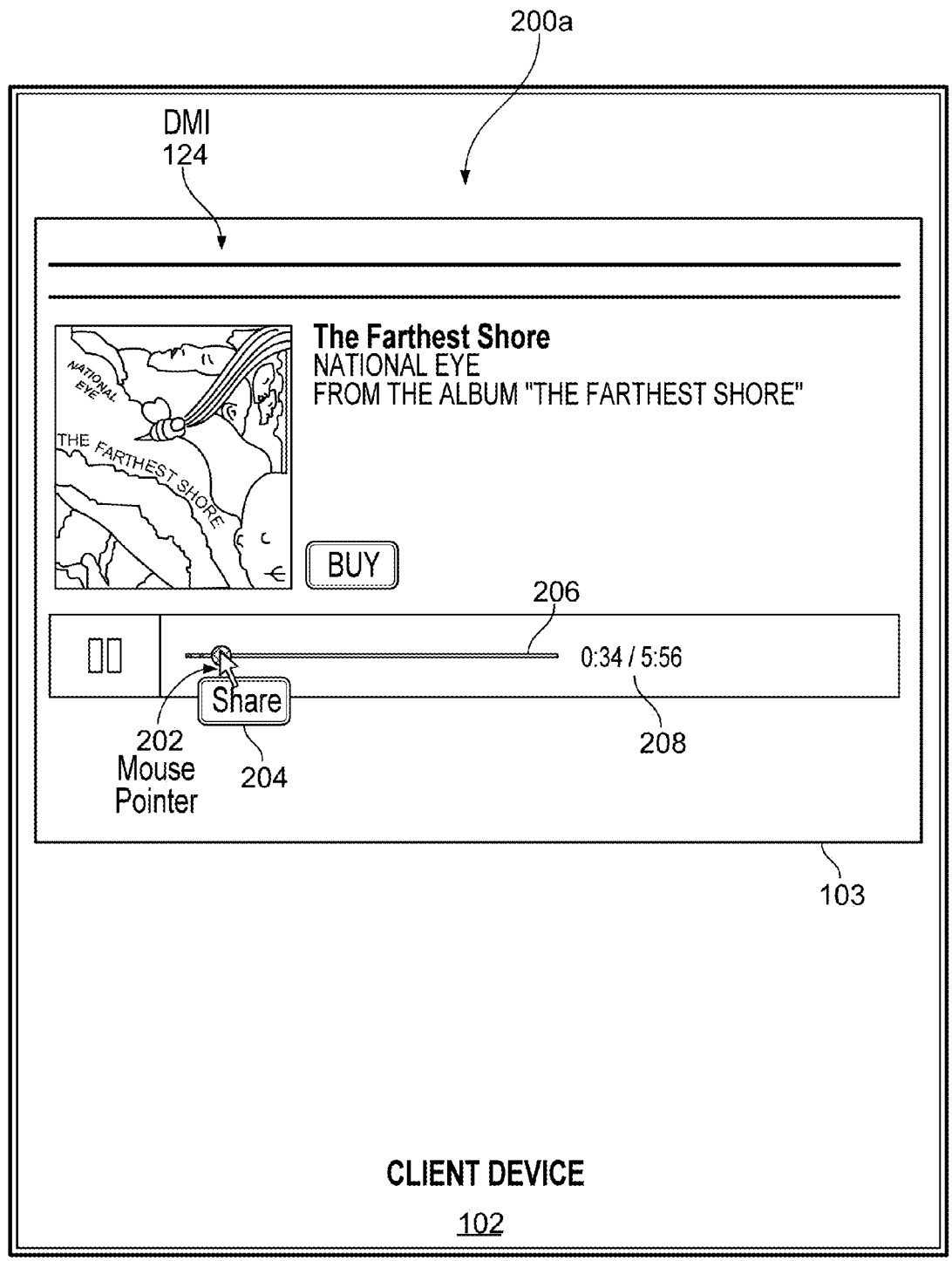
FIG. 2A is a block diagram illustrating an example graphical user interface (GUI) for initiating sharing of digital media content using a client device, in accordance with an example embodiment of the disclosure.

FIG. 2A is a block diagram illustrating an example graphical user interface (GUI) 200*a* for initiating sharing of digital media content using a client device, in accordance with an example embodiment of the disclosure. Referring to FIG. 2A, there is illustrated the client device 102 with a display 103 showing the GUI 200*a*.

As explained above in reference to FIG. 1, user A may obtain rights to share a clip selection from a digital media item (DMI) 124 (e.g., user A may have purchased the DMI 124). Alternatively, user A may not have purchased the DMI 124 but may still be allowed to share a clip selection (up to a maximum allowed clip duration, such as 30 or 90 seconds). The DMI 124 may be, for example, a song (e.g., track "The Farthest Shore" by National Eye).

When user A is listening to the DMI 124, a progress bar 206 and a time counter 208 may be displayed. While listening to the DMI 124 using the client device 102, if user A places the mouse pointer 202 over the duration bar 206, a "Share" button 204 may appear on the display 103. The "Share" button may allow user A to share a short duration (e.g., 30 or 90 seconds) clips of the DMI 124.

If user A selects the "Share" button 204, start and end points may appear on the duration bar 206 as clip markers for designating the portion of the DMI 124 which will be shared. The location of the clip markers (start and end points) on the duration bar 206 may be based on whether or not user A has previously consumed the DMI 124 (as illustrated in greater detail in reference to FIGS. 2B-2D below).

Figure 2B:
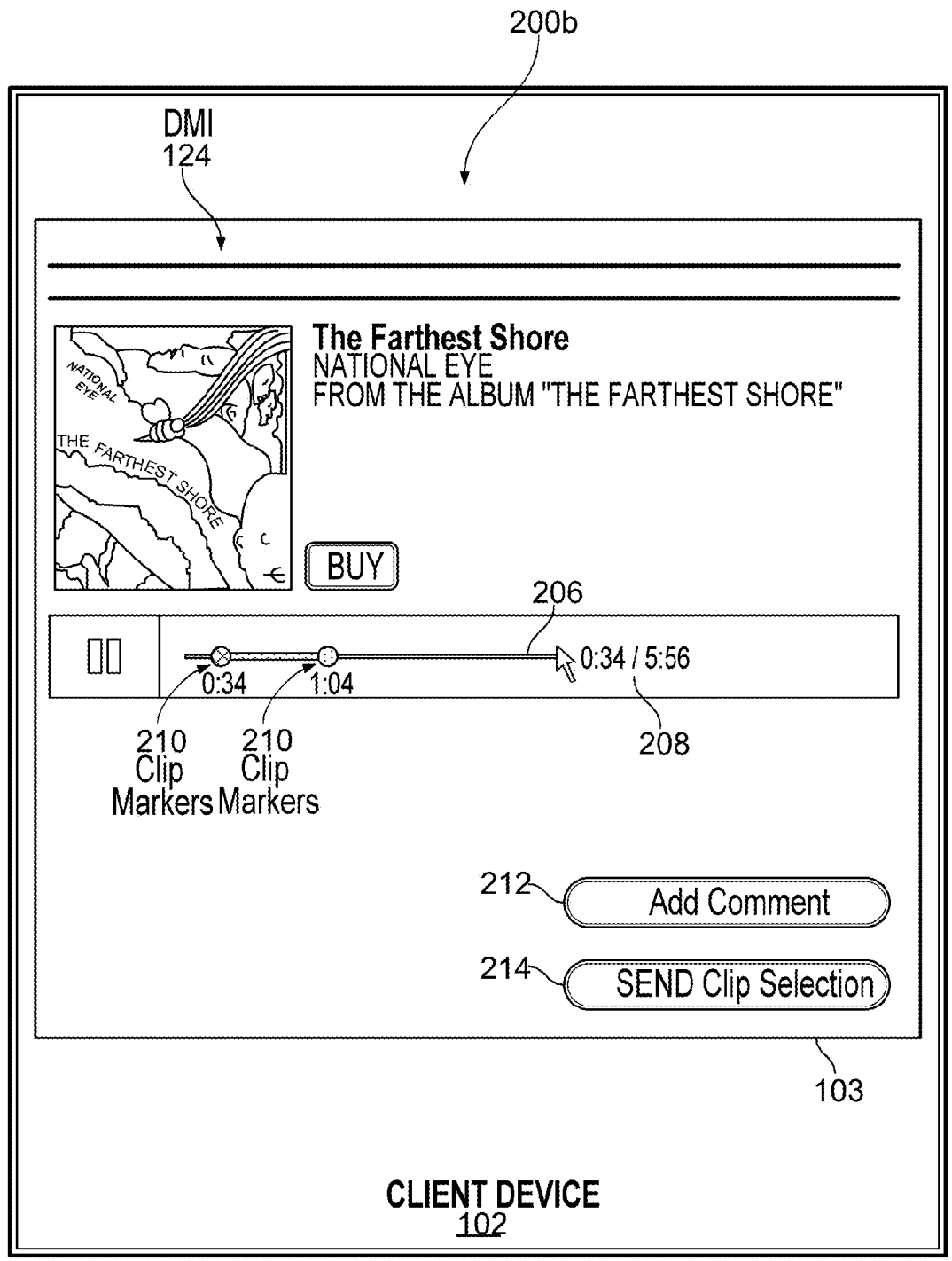
FIG. 2B is a block diagram illustrating an example GUI for sharing of previously consumed digital media content using a client device, in accordance with an example embodiment of the disclosure.

FIG. 2B is a block diagram illustrating an example GUI for sharing of previously consumed digital media content using a client device, in accordance with an example embodiment of the disclosure. Referring to FIG. 2B, the GUI 200*b* may appear on the display 103 if user A selects the "Share" button 204 (FIG. 2A) while listening to the DMI 124 and the DMI 124 has been previously consumed by user A.

For example, user A may select the "Share" button 204 at "0:34" elapsed time count (i.e., at the 34$^{th}$ second after initiating DMI 124 playback). The client device 102 may communicate with the media backend 112 to obtain a number of times user A has previously consumed DMI 124 (e.g., a previous play count). In this instance, the media backend 112 may return a previous play count as being greater than one.

Since the previous play count is greater than one (i.e., user A has already listened to DMI 124 at least once), clip markers 210 may automatically appear at the 0 m 34 s mark (start point) and at the 1 m 04 s mark (end point). In other words, the start point of the clip selection is set to be the current (0:34) position while listening to the DMI 124, and the end point is set 30 seconds later (since user A has already listened to DMI 124 before, odds are user A knows what is coming up).

Furthermore, user A may contract the clip markers 210 (i.e., shorten the clip duration) prior to sharing it. However, user A may not expand the clip duration beyond the maximum clip duration allowed for sharing of clip selections of the DMI 124 (GUI 200*b* illustrates a clip selection with a maximum clip duration of 30 seconds). User A may also slide the clip markers 210 along the duration bar 206 so that new start and end points of the clip selection may be allocated prior to communicating the new clip selection to user B. The GUI 200*b* (or any of the other GUIs disclosed herein) may also provide a preview button (not illustrated in the figures), which may be used by user A to preview the clip selection prior to communicating it to user B.

In accordance with an example embodiment of the disclosure, GUI 200*b* (or any of the other GUIs disclosed herein) may include an "Add Comment" button 212, which may be used by user A to add a comment to the shared clip selection prior to communicating it to user B. User A may select at what time position within the selected clip, the comment may be inserted.

The GUI 200*b* may also provide a "Send Clip Selection" button 214. After the clip selection is concluded and user A presses the "Send Clip Selection" button 214, a new GUI may open where user A may select the method of communicating the clip selection to user B (e.g., via email or a social web site), as well as enter identifying information for user B (e.g., name and email) so that the clip selection may be communicated to the recipient.

Figure 2C:
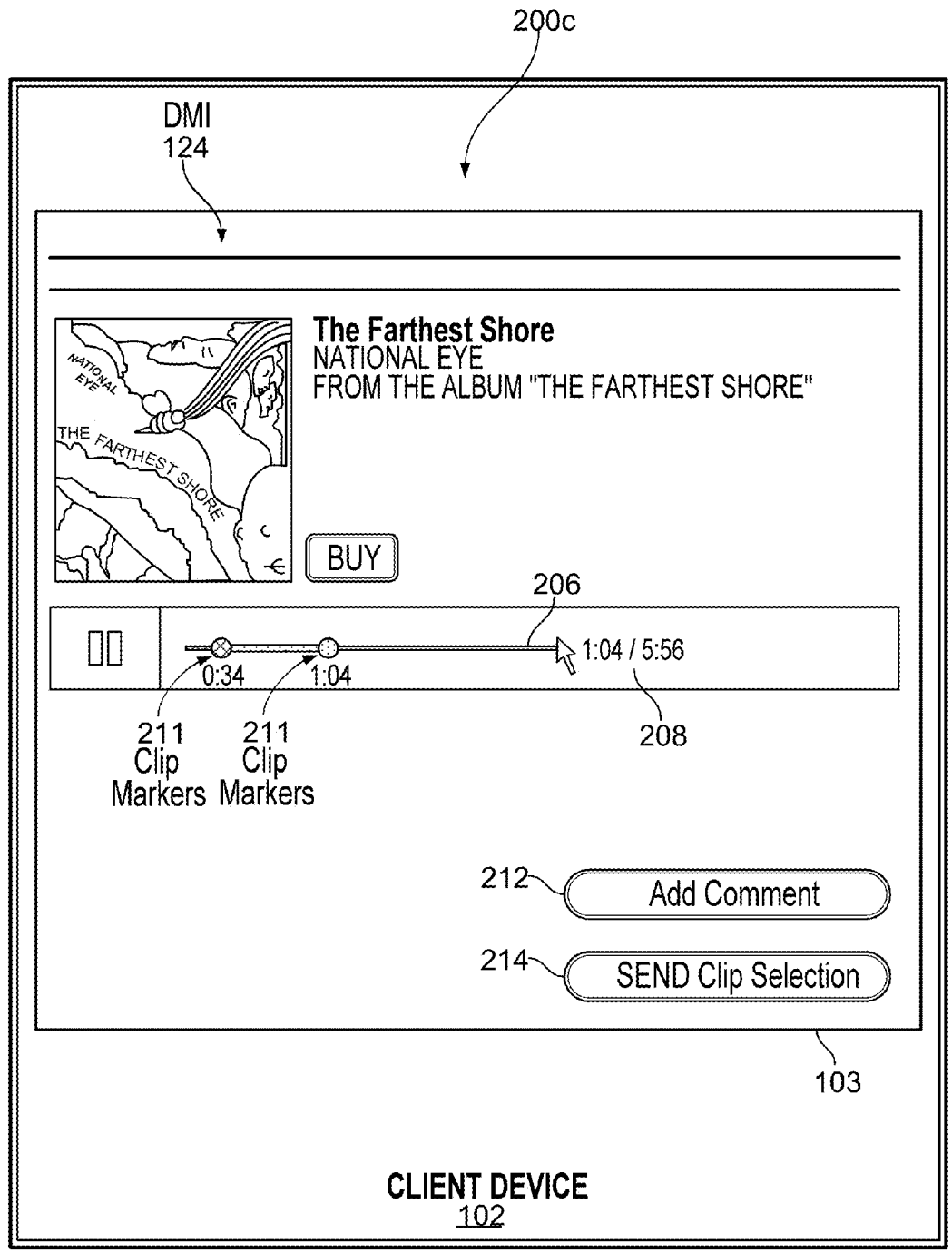
FIG. 2C is a block diagram illustrating an example GUI for sharing of non-consumed digital media content using a client device, in accordance with an example embodiment of the disclosure.

FIG. 2C is a block diagram illustrating an example GUI for sharing of non-consumed digital media content using a client device, in accordance with an example embodiment of the disclosure. Referring to FIG. 2C, the GUI 200*c* may appear on the display 103 if user A selects the "Share" button 204 (FIG. 2A) while listening to the DMI 124 and the DMI 124 has not been previously consumed by user A.

For example, user A may select the "Share" button 204 at "1:04" elapsed time count (i.e., at the 1 min. and 4 second after initiating DMI 124 playback). The client device 102 may communicate with the media backend 112 to obtain a number of times user A has previously consumed DMI 124 (e.g., a previous play count). In this instance, the media backend 112 may return a previous play count as being zero (i.e., user A is presently listening to the DMI 124 for a first time).

Since the previous play count is zero (i.e., user A has not listened to DMI 124 before), clip markers 211 may automatically appear at the 0 m 34 s mark (start point) and at the 1 m 04 s mark (end point). In other words, the start point of the clip selection is set to be 30 second back at the (0:34) position, while the end point is set at the current 1 m 04 s position (since user A has not previously listened to DMI 124, odds are user A does not know what is coming up and the user wants to share what they just heard).

Figure 2D:
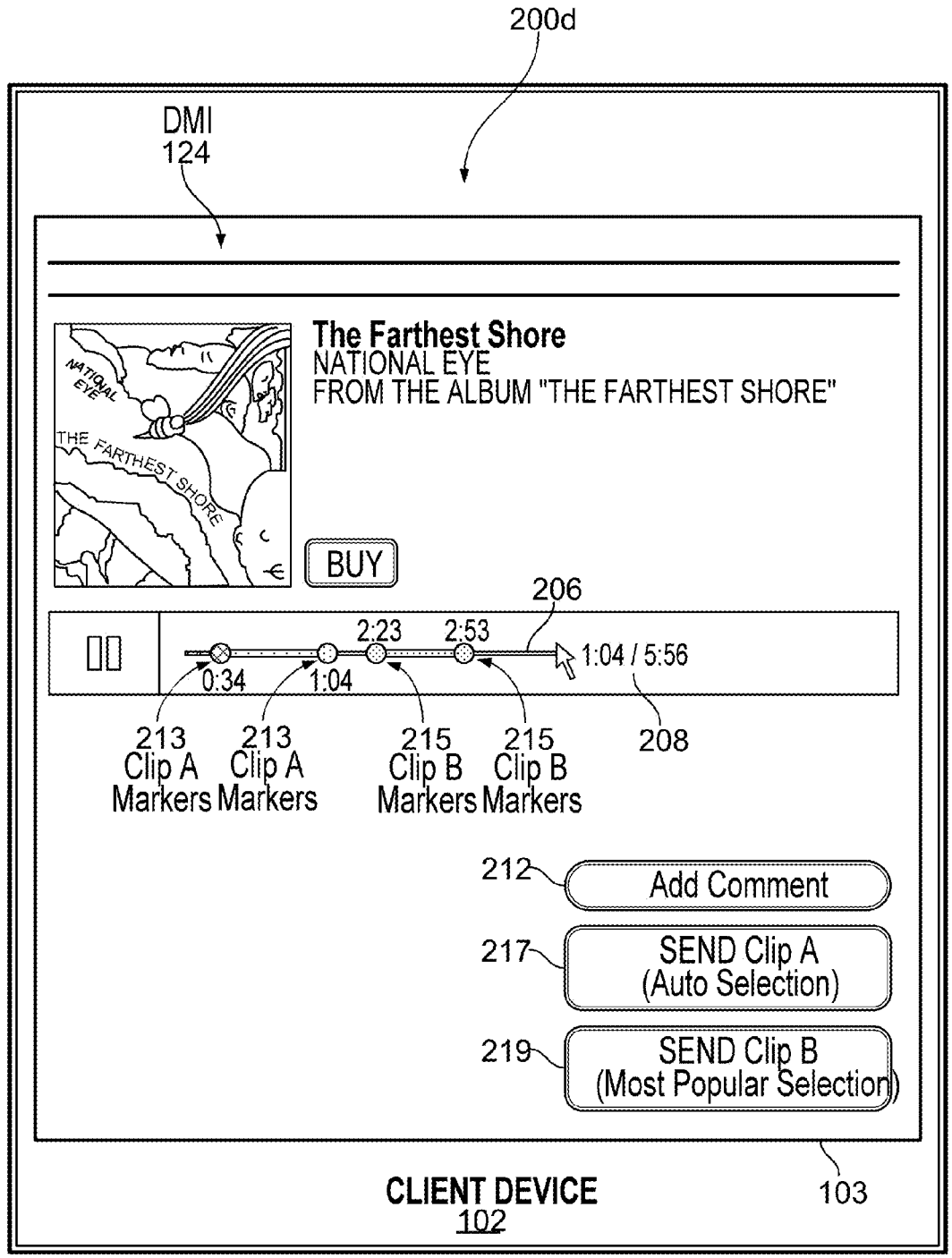
FIG. 2D is a block diagram illustrating an example GUI for selecting a clip for sharing from a plurality of digital media content clips using a client device, in accordance with an example embodiment of the disclosure.

FIG. 2D is a block diagram illustrating an example GUI for selecting a clip for sharing from a plurality of digital media content clips using a client device, in accordance with an example embodiment of the disclosure. Referring to FIG. 2D, the GUI 200*d* may appear on the display 103 if user A selects the "Share" button 204 (FIG. 2A) while listening to the DMI 124 and the DMI 124 has not been previously consumed by user A, or when user A selects the "Share" button 204 and has not started (or has finished) consuming the DMI 124.

For example, user A may select the "Share" button 204 at "1:04" elapsed time count (i.e., at the 1 min. and 4 second after initiating DMI 124 playback). The client device 102 may communicate with the media backend 112 to obtain a number of times user A has previously consumed DMI 124 (e.g., a previous play count). In this instance, the media backend 112 may return a previous play count as being zero (i.e., user A is presently listening to the DMI 124 for a first time). Since the previous play count is zero (i.e., user A has not listened to DMI 124 before), clip A markers 213 may automatically appear at the 0 m 34 s mark (start point) and at the 1 m 04 s mark (end point). In other words, the start point of the clip selection is set to be 30 second back at the (0:34) position, while the end point is set at the current 1 m 04 s position (since user A has not previously listened to DMI 124, odds are user A does not know what is coming up and the user wants to share what they just heard).

In instances when user A selects the "Share" button 204 either before starting consumption of DMI 124 or DMI 124 has finished playing, instead of providing only the first or last 30 seconds of DMI 124, a second (e.g., most popular) clip selection may be provided. More specifically, the client device 102 may communicate with the media backend 112 to obtain the most shared clip selection for the DMI 124. For example, the media backend 112 may report back to the client device 102 the most shared start time by getting a mode of the most popular 5 second window of start times and then picking the median of those. In this regard, user A may still obtain clip B markers 215, which selects the start and end times of a most popular clip selection from the DMI 124. As illustrated in FIG. 2D, the GUI 200d may provide "Send Clip A" button 217 (which is the same as the "Send Clip Selection" button 214 in FIG. 2C) associated with the automatic selection of clip A markers 213. The GUI 200d may also provide "Send Clip B" button 219, which is associated with the most popular clip selection designated by clip B markers 215.

In accordance with an example embodiment of the disclosure, the GUI 200d may display only the clip B markers 215 (and the corresponding "Send Clip B" button 219) when, for example, user A has not started (or has finished) consuming DMI 124 and wishes to share a clip selection from the DMI 124.

After user A finalizes the clip selection, one of buttons 217 or 219 may be pressed to trigger the communication of the clip selection. In this regard, the media backend 112 may be operable to store three pointers for the clip communication. More specifically, the media backend 112 may store a pointer to the piece of digital content that user A is sharing (e.g., DMI 124), a pointer to the millisecond value of the beginning of the clip and a pointer to the end of the clip. When a share recipient (e.g., user B) receives a notification of the shared clip from user A (e.g., receives a link for the clip playback) and hits play, the following tuple [uniqueID, startTime, endTime] may be communicated to the media backend 112. The media backend 112 may then return to user B a media stream of the clip selection, starting the playback of DMI 124 at startTime and ending playback after (endTime-startTime) milliseconds.

Figure 3:
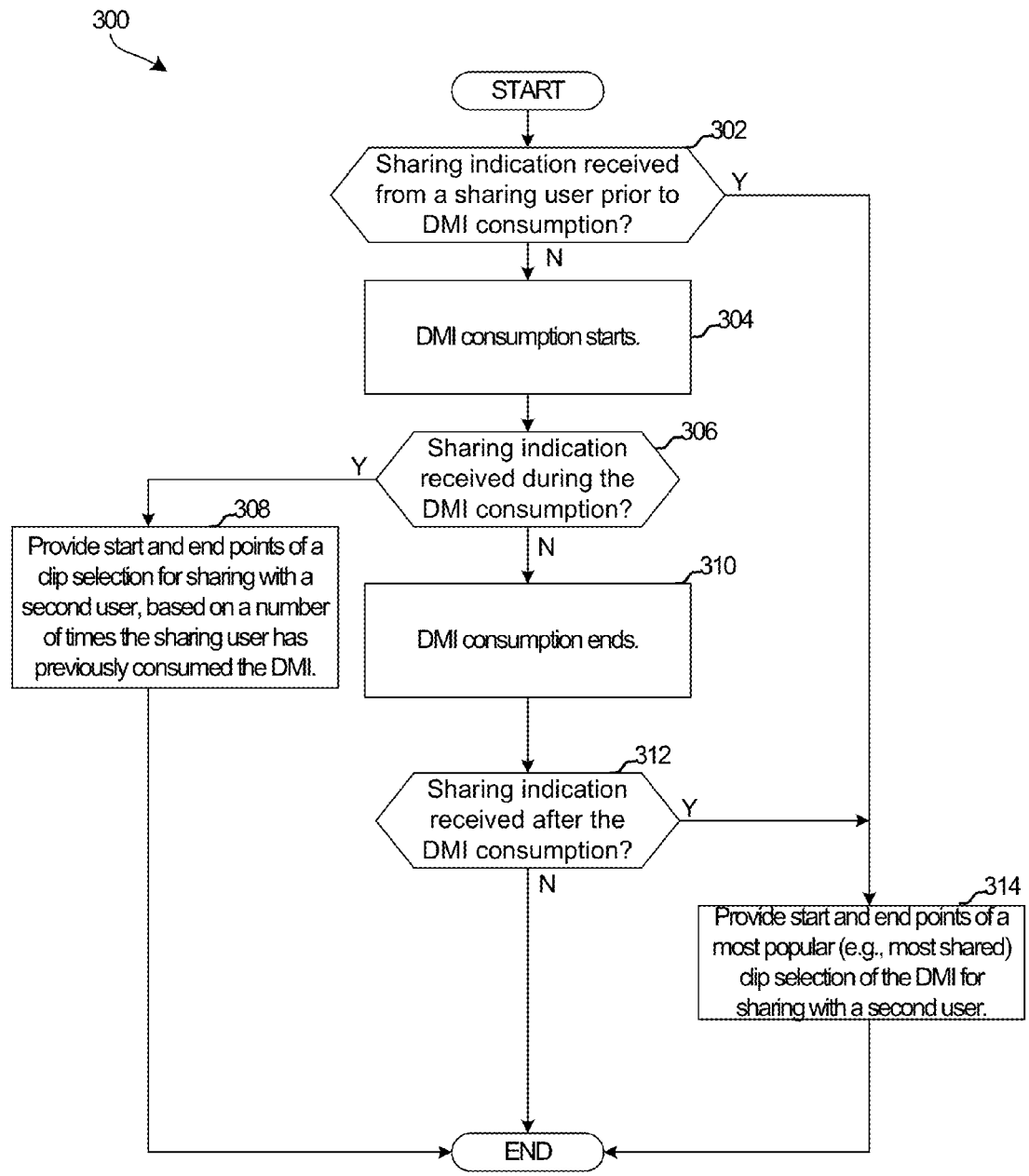
FIG. 3 is a flow chart illustrating example steps of a method for sharing of digital media, in accordance with an example embodiment of the disclosure.

FIG. 3 is a flow chart illustrating example steps of a method for sharing of digital media, in accordance with an example embodiment of the disclosure. Referring to FIGS. 1-3, the example steps of method 300 may start at 302, when it may be determined whether a sharing indication is received from a sharing user prior to DMI consumption. For example, it may be determined whether user A (the sharing user) has initiated sharing by pressing the "Share" button 204 prior to starting listening to DMI 124.

If it is determined that a sharing indication is received from the sharing user prior to DMI consumption, at 314, start and end points of a most popular (e.g., most shared) clip selection (e.g., clip markers 215) of the DMI 124 may be provided for sharing with user B.

If it is determined that a sharing indication is not received from the sharing user prior to DMI consumption, at 304, consumption of the DMI 124 may start. At 306, it may be determined whether a sharing indication is received during the DMI consumption. If it is determined that a sharing indication is received during the DMI consumption, at 308, start and end points of a clip selection may be provided for sharing with user B, based on a number of times the sharing user has previously consumed the DMI 124 (e.g., as explained in reference to FIGS. 2A-2D).

If it is determined that a sharing indication is not received during the DMI consumption, at 310, DMI consumption may end. At 312, it may be determined whether a sharing indication is received after the DMI 124 consumption has ended. If it is determined that a sharing indication is received after the DMI 124 consumption has ended, at 314, start and end points of a most popular (e.g., most shared) clip selection (e.g., clip markers 215) of the DMI 124 may be provided for sharing with user B. If it is determined that a sharing indication is not received after the DMI 124 consumption has ended, processing may end.

Figure 4:
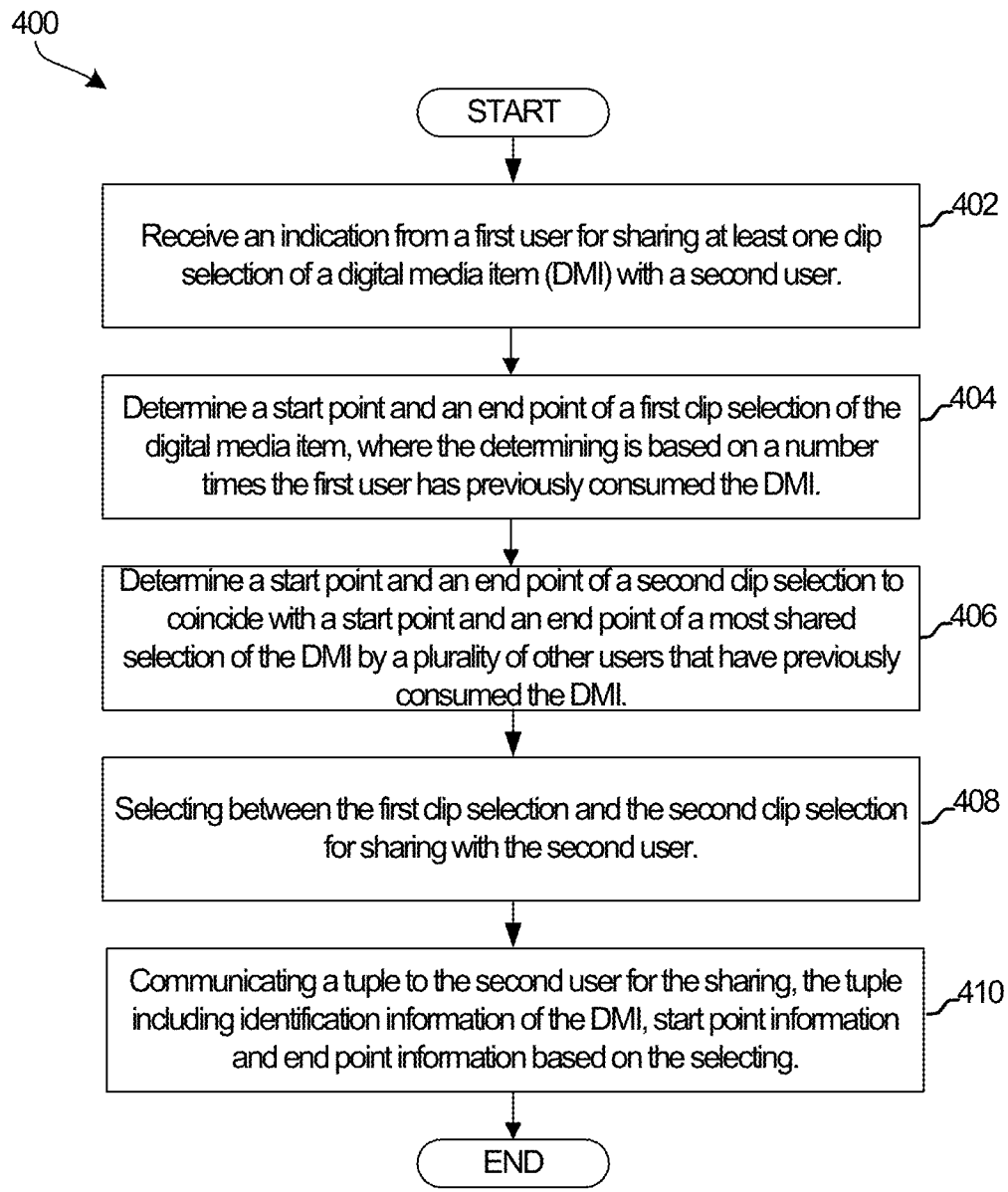
FIG. 4 is a flow chart illustrating example steps of a second method for sharing of digital media, in accordance with an example embodiment of the disclosure.

FIG. 4 is a flow chart illustrating example steps of a second method for sharing of digital media, in accordance with an example embodiment of the disclosure. Referring to FIGS. 1-2D and 4, the example method 400 may start at 402, when an indication may be received from a first user (e.g., user A) for sharing at least one clip selection (e.g., 210, 211, 213, 215) of a digital media item (e.g., DMI 124) with a second user (e.g., user B).

At 404, a start point and an end point of a first clip selection of the digital media item may be determined, where the determining may be based on a number times the first user has previously consumed the DMI 124 (as explained in greater detail with reference to FIGS. 2A-2C). At 406, a start point and an end point of a second clip selection may be determined to coincide with a start point and an end point of a most shared selection of the DMI by a plurality of other users that have previously consumed the DMI 124 (e.g., FIG. 2D and clip B markers 215).

At 408, user A may select between the first clip selection and the second clip selection for sharing with the second user (e.g., by pressing button 217 to share the automatic clip selection, or by pressing button 219 for sharing the most popular clip selection). At 410, a tuple may be communicated to the second user for the sharing, where the tuple may include identification information of the DMI, start point information and end point information based on the selecting.

Figure 5:
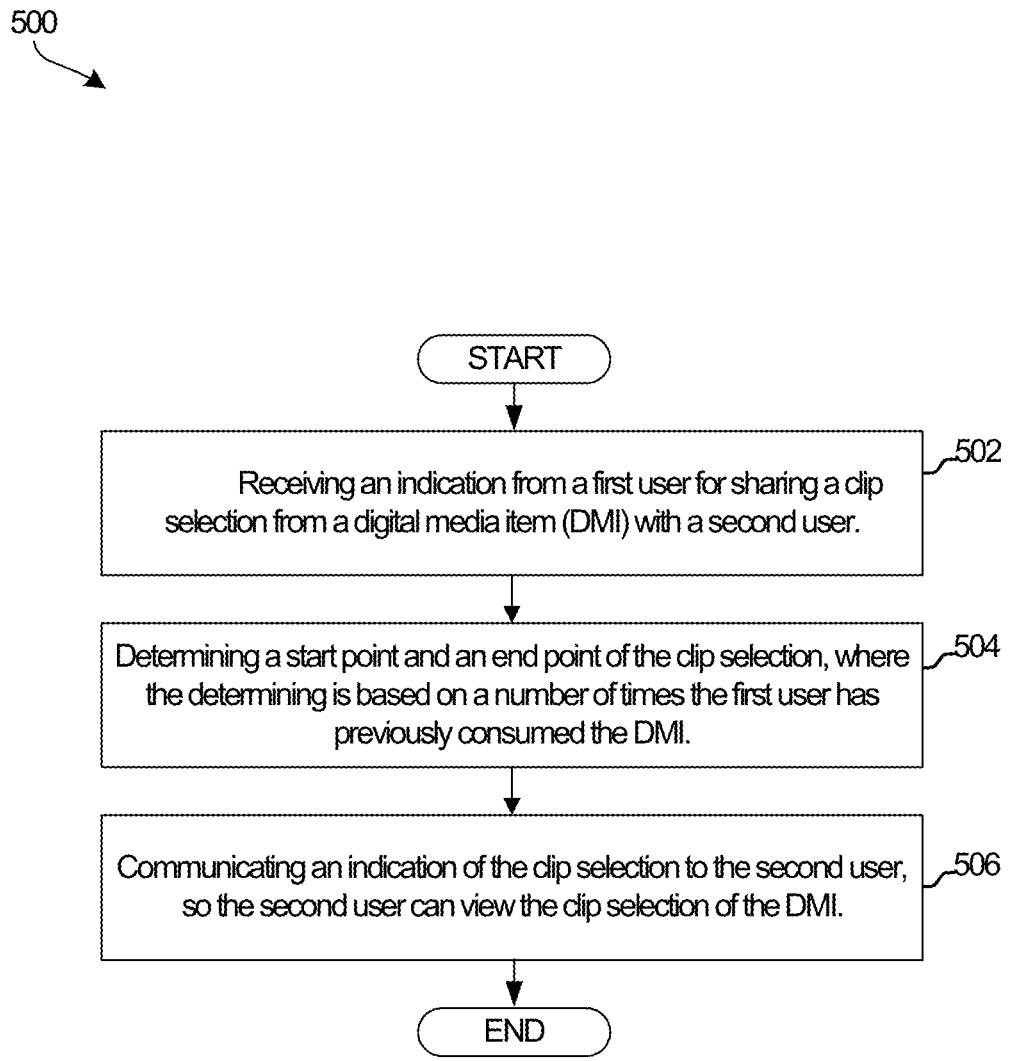
FIG. 5 is a flow chart illustrating example steps of a third method for sharing of digital media, in accordance with an example embodiment of the disclosure.

FIG. 5 is a flow chart illustrating example steps of a third method for sharing of digital media, in accordance with an example embodiment of the disclosure. Referring to FIGS. 1-2D and 5, the example method 500 may start at 502, when an indication may be received from a first user (e.g., user A hitting the Share button 204) for sharing a clip selection from a digital media item (e.g., DMI 124) with a second user (e.g., user B). At 504, a start point and an end point of the clip selection may be determined, where the determining is based on a number of times the first user has previously consumed the DMI 124 (as explained in reference to FIGS. 2A-2D). At 506, an indication of the clip selection may be communicated to the second user (e.g., user B), so the second user can view the clip selection of the DMI 124 (e.g., by pressing "Send Clip Selection" button 214).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for sharing of digital media.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for sharing digital media, the method comprising:
receiving an indication from a first user for sharing a clip selection from a digital media item with a second user;
communicating, to a media backend, a request for a number of times that the first user has consumed the digital media item;
determining that the first user has previously consumed the digital media item based on a response from the media backend;
during a consumption by the first user, based on the determining that the first user has previously consumed the digital media item, setting a first start point of a first clip selection as a current location in the digital media item at a time when the indication for the sharing was received;
setting a first end point of the first clip selection at a location in the digital media item that is later than the current location by a predetermined time interval;
determining a second start point and a second end point of a second clip selection to coincide with a third start point and a third end point of another clip selection of the digital media item, the other clip selection being a popular selection of a plurality of other users that have previously consumed the digital media item;
determining, for sharing with the second user, a selection between the first clip selection and the second clip selection; and
communicating an indication of the selection to the second user.

2. The method according to claim 1, comprising:
receiving the indication for the sharing in response to a sharing query, wherein the sharing query is displayed to the first user during the consumption of the digital media item by the first user.

3. The method according to claim 1, comprising:
displaying the first start point and the first end point on a duration bar of the digital media item.

4. The method according to claim 3, comprising:
adjusting one or both of the first start point and/or the first end point of the first clip selection based on a command from the first user.

5. The method according to claim 4, comprising:
limiting the adjusting so that a duration of the first clip selection does not exceed a maximum allowed clip duration.

6. A system for sharing digital media, the system comprising:
one or more circuits comprising in a user device, the one or more circuits being operable to:
receive an indication from a first user for sharing a clip selection from a digital media item with a second user;
communicate, to a media backend, a request for a number of times that the first user has consumed the digital media item;
determine that the first user has previously consumed the digital media item based on a response from the media backend;
during a consumption by the first user, based on the determining that the first user has previously consumed the digital media item, set a first start point of a first clip selection as a current location in the digital media item at a time when the indication for the sharing was received;
set a first end point of the first clip selection at a location in the digital media item that is later than the current location by a predetermined time interval;
determine a second start point and a second end point of a second clip selection to coincide with a third start point and a third end point of another clip selection of the digital media item, the other clip selection being a popular selection of a plurality of other users that have previously consumed the digital media item;
determine, for sharing with the second user, a selection between the first clip selection and the second clip selection; and
communicate an indication of the selection to the second user.

7. The system according to claim 6, wherein the one or more circuits are operable to:

receive the indication for the sharing in response to a sharing query, wherein the sharing query is displayed to the first user during the consumption of the digital media item by the first user.

8. The system according to claim 6, wherein the one or more circuits are operable to:
display the first start point and the first end point on a duration bar of the digital media item.

9. The system according to claim 8, wherein the one or more circuits are operable to:
adjust one or both of the first start point and/or the first end point of the first clip selection based on a command from the first user.

10. The system according to claim 9, wherein the one or more circuits are operable to:
limit the adjusting so that a duration of the first clip selection does not exceed a maximum allowed clip duration.

11. A system for sharing digital media, the system comprising:
one or more circuits comprising in a user device, the one or more circuits being operable to:
receive an indication from a first user for sharing at least one clip selection of a digital media item with a second user;
communicate, to a media backend, a request for a number of times that the first user has consumed the digital media item;
determine, for a first clip selection of the digital media item based on a response from the media backend, a first start point and a first end point, wherein the response indicates that the number of times that the first user has previously consumed the digital media item is greater than one;
determine a second start point and a second end point of a second clip selection to coincide with a third start point and a third end point of another clip selection of the digital media item, the other clip selection being a popular selection of a plurality of other users that have previously consumed the digital media item;
determine, for sharing with the second user, a selection between the first clip selection and the second clip selection; and
communicate a tuple to the second user for the sharing, the tuple comprising identification information of the digital media item, and start point information and end point information based on the selection.

12. The method according to claim 1, wherein a duration of the predetermined time interval is based on digital rights that the first user has for the digital media item.

13. The system according to claim 6, wherein a duration of the predetermined time interval is based on digital rights that the first user has for the digital media item.

14. The system according to claim 11, wherein a duration of a time interval between the first start point and the second start point is based on digital rights that the first user has for the digital media item.

15. A system for sharing digital media, the system comprising:
one or more circuits comprising in a user device, the one or more circuits being operable to:
receive an indication from a first user for sharing a clip selection from a digital media item with a second user;
communicate, to a media backend, a request for a number of times that the first user has consumed the digital media item;
determine, for a first clip selection based on a response from the media backend, a first start point and a first end point, wherein the response indicates the number of times the first user has previously consumed the digital media item;
determine a second start point and a second end point of a second clip selection to coincide with a third start point and a third end point of another clip selection of the digital media item, the other clip selection being a popular selection of a plurality of other users that have previously consumed the digital media item;
determine, for sharing with the second user, a selection between the first clip selection and the second clip selection; and
communicate an indication of the selection to the second user.

16. The system according to claim 15, wherein if the first user has not previously consumed the digital media item, then during a consumption of the digital media by the first user, the one or more circuits are operable to:
set the first end point as a current location in the digital media item at a time when the indication for the sharing was received; and
set the first start point at a location in the digital media item that is earlier than the current location by the time interval.

17. The system according to claim 15, wherein the one or more circuits are operable to:
display the first start point and the first end point on a duration bar of the digital media item;
adjust one or both of the first start point and/or the first end point of the first clip selection based on a command from the first user; and
limit an adjustment of the one or both of the first start point and/or the first end point so that a duration of the first clip selection does not exceed a maximum allowed clip duration.

18. The system according to claim 17, wherein the maximum allowed clip duration is based on digital rights that the first user has for the digital media item.

* * * * *